United States Patent

[11] 3,620,610

[72] Inventor Richard K. Carlson
Chicago, Ill.
[21] Appl. No. 889,276
[22] Filed Dec. 30, 1969
[45] Patented Nov. 16, 1971
[73] Assignee Bell & Howell Company
Chicago, Ill.

[54] FILM FOOTAGE INDICATOR
9 Claims, 6 Drawing Figs.

[52] U.S. Cl. .................................................. 352/172
[51] Int. Cl. .................................................. G03b 1/60
[50] Field of Search........................................ 352/172,
170, 171, 249; 116/67.2, 114.1 D

[56] References Cited
UNITED STATES PATENTS
1,926,703  9/1933  Spence, Jr ................. 352/172
2,014,202  9/1935  Foster et al. ............... 352/172
2,148,493  2/1939  Nowland .................... 352/172 X Primary Examiner—Donald O. Woodiel
Attorneys—William F. Pinsak and Kenneth W. Greb ABSTRACT: The invention embraced in the following disclosure has reference to film footage indicators and consists of a bracket adapted to be rocked from operative to inoperative positions by the insertion of a film cartridge into a camera. Associated with the bracket is a sliding plate which is provided with a tooth in engagement with a driving threaded member. An opening in the sliding plate confines an indicator or pointer and motivates the same along the threaded member. A graduated scale marked S (start) and F (finish) shows the proportional or fractional amount of film exposed, from which by deduction the unexposed portion of film can be calculated. The threaded member has secured thereto a pinion which is driven one tooth at a time by a claw member moving in an elliptical orbit engaging and disengaging itself from the pinion. The claw member is cam actuated and is slidably connected to a pin element which results in the orbit referred to before

PATENTED NOV 16 1971 3,620,610

Inventor:
Richard K. Carlson.

By William J. Pringle Atty

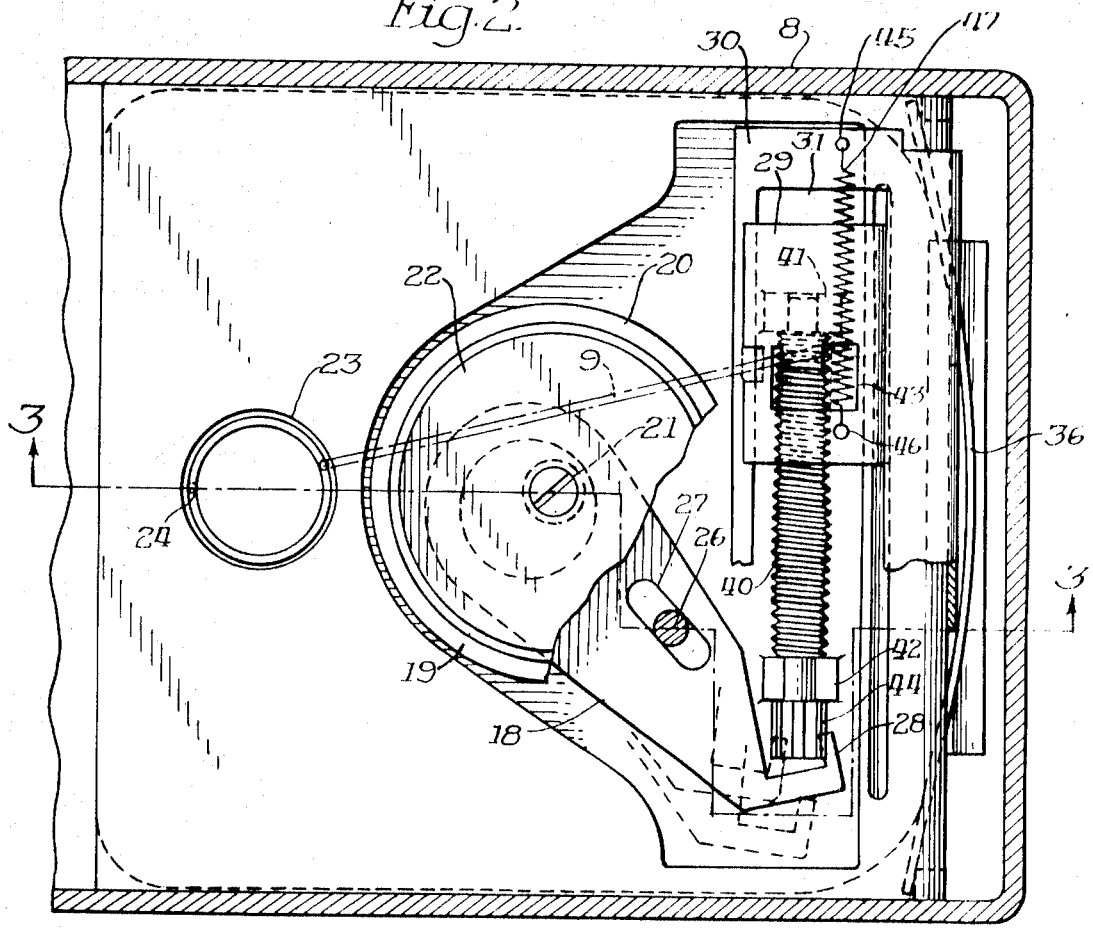
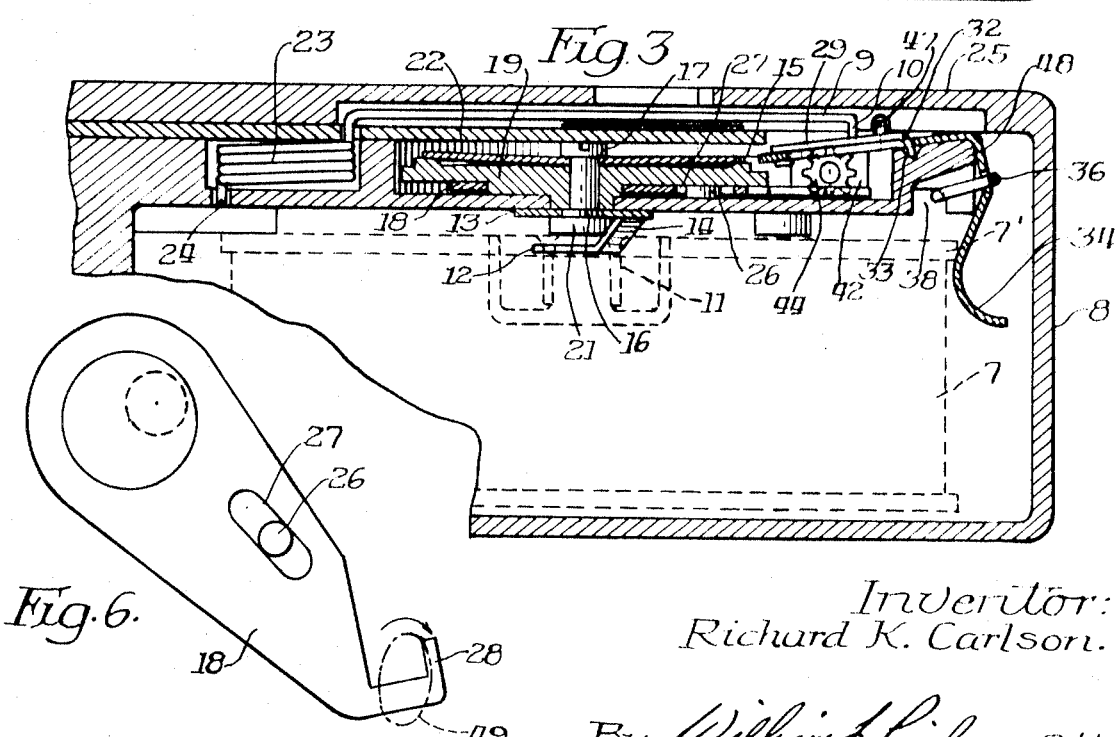
Fig.2.
Fig.3.
Fig.6.
Inventor:
Richard K. Carlson.
By William F. Pinck Atty

FILM FOOTAGE INDICATOR

The instant invention relates to film footage indicators for cartridge-loaded cameras and has for its main purpose to show the proportionate amount or footage of film that has been exposed which by interpolation indicates also the unexposed portion of film still remaining.

Various types of footage indicator mechanisms suitable for use with cartridge load motion picture cameras as well as other types of motion picture cameras are well known in the art. Usually, the film drive mechanism is utilized to rotate an indicator disc so that, as the film moves through the camera the indicator disc revolves to provide an indication of the amount of film that has been used. Alternatively, the indicator disc could indicate the amount of film remaining on the film supply reel. In any event, prior art film footage indicator mechanisms are usually somewhat complex in that they require a large number of gears and other components which are usually spring biased in some manner so as to return the indicator disc to an initial position each time a new supply of film is inserted into the camera. Because a large number of components are needed, prior art film footage indicator mechanisms are expensive to manufacture and repair and subject to failure. Hence it is desirable to provide a film footage indicator mechanism which uses a minimum number of components, thereby making it less expensive to manufacture and repair, and more reliable.

It is an object of this invention to provide a device of the character described which is adapted for use principally with cameras of the type which are cartridge loaded.

It is another object of this invention to provide a mechanism which consists of a spring-urged rocking bracket actuated by the insertion of a film cartridge to operative position.

It is another object of this invention to provide a sliding bracket associated slidably with reference to said rocking bracket.

It is a further object of this invention to provide driven threaded means engageable by a toothed portion on said sliding bracket for slidably motivating said sliding bracket along a calibrated scale.

It is another object of this invention to provide an opening in said sliding bracket, and an indicator anchored by a torsional spring in order to return said indicator to S-position; said sliding bracket being returned to S-position by another tension spring, when a film cartridge is removed.

It is a further object of the invention to provide a film footage indicator having the foregoing characteristics which will be efficient in use, durable, and which is economical to manufacture in mass production.

Further and other objects will be apparent from the description of the accompanying drawings, in which like numerals relate to like parts.

In the drawings:

FIG. 2 is a cross-sectional view taken substantially on line 2—2 of FIG. 1;

FIG. 3 is a transverse cross-sectional view substantially on line 3—3 of FIG. 2 looking in the direction of the arrows;

FIG. 6 is a view of the claw member and the elliptical path of movement used to rotate the driving threaded member.

Referring to the various views, it will be noted that the invention is generally designated 5 and is associated with a camera 6 shown in phantom.

Figure 4:
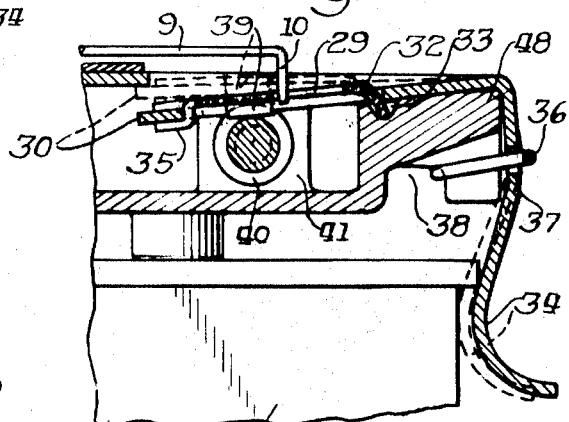
FIG. 4 is an enlarged fragmentary cross-sectional view indicating the rocking movement of the rocking bracket.

The mechanism for indicating proportionately the exposed and unexposed portion of film is mounted within casing 8 and consists of a wire pointer element 9 provided with a formed finger 10. Pointer element 9 is also formed to include coil spring 23 anchored at 24 and adapted to be torsionally responsive to return the pointer element 9 to S-position when a cartridge flange 7' is released from contact with spring portion 34 of rocking bracket 30. Spring 36 is fitted in assembly to slots 37 of rocking bracket 30 and anchored by its ends in recesses 38 formed in support extension 48 as shown in FIG. 4. Rocking bracket 30 has a slotted open rectangular portion 31, one edge of which is engaged by tab 35 of sliding bracket 29. The opposite edge of sliding bracket 29 by virtue of lip 32 engages groove 33 also shown in FIG. 4.

Sliding bracket 29 has an open window 43 from which a downwardly dependent tooth 39 is angularly set to engage the pitch of driving thread 40, causing tooth 39 to move by rotation of said thread 40. The pointer 9 has its finger portion 10 in intimate contact with an edge of window 43 urging said finger portion 10 along the calibrated scale from S to F.

Thread 40 is rotatably secured in bearings 41 and 42 and is connected to a spur pinion 44 which is motivated by a claw member 18 which is fulcrummed on body 21 upon which rotates cam portion 19, it being integral with driving gear 15 (shown in FIG. 3). Driving gear 15 is rotatably mounted on a post 17 and is frictionally sandwiched between a flat spring 22 and a clutch spring 13 for providing a friction clutch 16 for rotating clutch spring 13. Clutch spring 13 has a pair of arm portions 14 (only one shown) extending therefrom for engaging clutch member 11 of a film cartridge 7 for taking up the film in a takeup hub (not shown) as the film is being fed for exposure. Friction clutch 16 is sufficiently light to permit driving gear 15 to rotate while clutch spring 13 remains stationary when the film is completely exposed and can no longer be taken up due to the trailing end of the film being rigidly anchored.

Motivation for pinion 44 is furnished by claw portion 28 of element 18 which has been described as cam actuated, it being further slidably mounted on pin 26 operating in slot 27. The resultant motion of claw portion 28, shown in FIG. 5, being in the form of an elliptical orbit moving clockwise as indicated at 49.

The claw member 18 motivates the pinion 44 one tooth at a time, hence threaded member 40 is motivated very slowly and consequently the bracket 29 is also moved slowly, because it has its tooth 39 moving in the root of the threaded member 40.

Sliding bracket 29 is returned to its starting position by means of spring 47 anchored at 45 on rocking bracket 30 and connected at its opposite end to sliding bracket 29 at 46; all of the structure being below deck 25 of the assembly.

A cartridge 7 is inserted into a camera 6, the flange 7' moves the arcuate portion 34 of rocking bracket 30 tilting the same downwardly, as shown by full and dotted lines in FIG. 4. The downward movement of rocking bracket 30 causes driving tooth 39 to engage the root of threaded member 40. The movement of tooth 39 is facilitated by the sliding bracket 29 which is guided slidably by its tab 35 in concert with its lip 32 which is simultaneously operating in the groove 33 of flange 48. The opening 43 is sliding bracket 29 serves to engage one of its edges with the finger portion 10 of the pointer 9 causing it to move along the scale from S to F.

The sliding bracket 29 is brought back to -position by means of spring 47 when cartridge 7 is removed S-position the spring 36 returns the rocking bracket 30 to the dotted positions shown in FIG. 4. The pointer 9 is returned to its S-position by means of its torsional spring 23.

Figure 1:
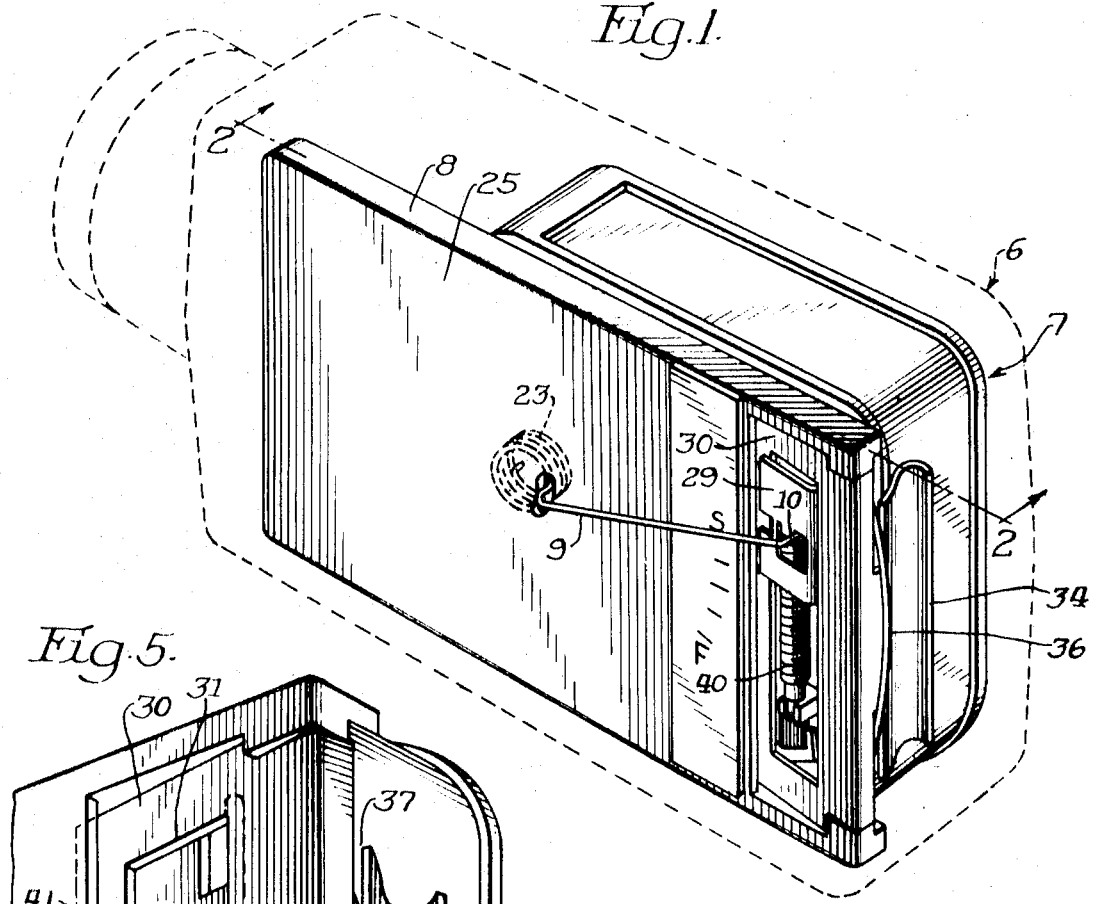
FIG. 1 is a perspective view of the invention embodied in a camera shown in phantom.
Figure 5:
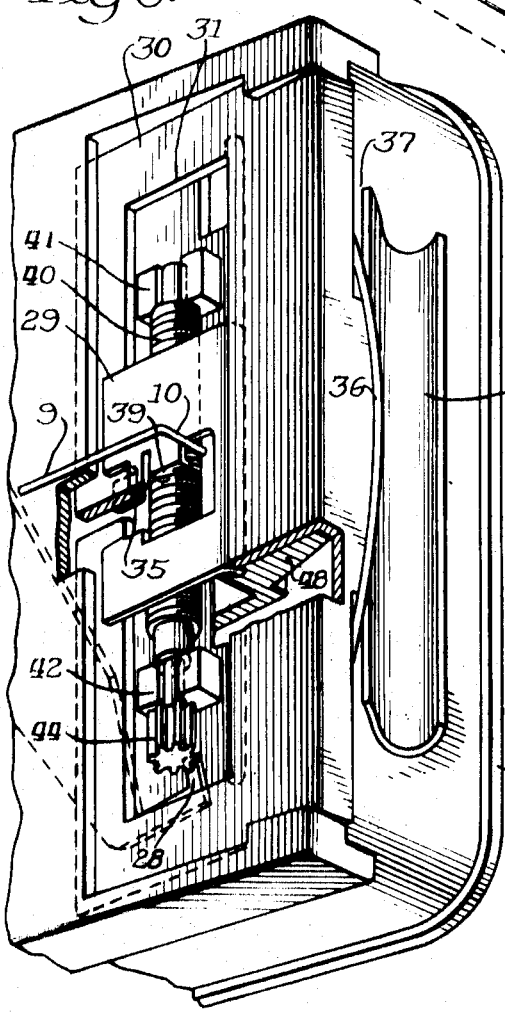
FIG. 5 is an enlarged perspective view with portions broken away to more clearly show the mechanism comprising the invention.

The driving gear 15 has a cam portion 19 which in concert with slotted portion 27 operates on pin 26 producing the slow movements shown in FIG. 5. The effect being that the elliptical orbit 49 defines movement of claw tooth 28 to engage and disengage itself with respect to pinion 44 causing it to be moved one tooth at a time.

The cartridge 7 must not be removed from the camera 6 until all of the film has been exposed. If that should be done, the pointer 9 will be returned to S and if cartridge 7 is subsequently reinserted then the indication of exposure of the balance of film will start at S the same as if a new cartridge were inserted.

The embodiments of the invention in which an exclusive property or privilege is claimed are defined as follows:

1. A film footage indicator mechanism comprising:
   a film footage reference means;
   a powered gear train for advancing the film;
   a threaded member operable by said gear train at a predetermined rate;
   a bracket means operable from an ineffective position to an effective position and in said effective position in engagement with said threaded member, said bracket means being moved from an initial position to an advanced position by said threaded member; and
   a spring member connected to said bracket means and having an integral pointer portion flexibly movable relative to said film footage reference means by movement of said bracket means for indicating the amount of film advanced.

2. A film footage indicator mechanism as defined in claim 1 further comprising means for returning said bracket means from said advanced position to said initial position when said bracket means is moved from said effective position to said ineffective position and said spring member is operable to follow said bracket means when said bracket means is returned to said initial position.

3. A film footage indicator mechanism as defined in claim 1 further comprising a rocking bracket operatively connected to said bracket means and a film supply means operable to rock said rocking bracket for moving said bracket means from said ineffective position to said effective position.

4. A film footage indicator mechanism as defined in claim 3 further comprising a spring for biasing said rocking bracket in a direction to move said bracket means from said effective position to said ineffective position when said film supply means is removed from said rocking bracket.

5. A film footage indicator mechanism as defined in claim 3 wherein said bracket means includes a tab portion slidably engaging said rocking bracket for movement relative to said rocking bracket.

6. A film footage indicator mechanism as defined in claim 1 wherein said bracket means includes a toothed portion releasably engaging said threaded member.

7. A film footage indicator mechanism as defined in claim 1 wherein said powered gear train includes a claw member operated in an orbital path for engaging and rotating said threaded member at said predetermined rate.

8. A film footage indicator mechanism as defined in claim 1 wherein said powered gear train includes a driving pinion connected to said threaded member and a claw member operated in an orbital path for engaging said incrementally rotating said driving pinion for rotating said threaded member at said predetermined rate.

9. A film footage indicator mechanism in a motion picture camera having a housing and a film supply cartridge adapted to be inserted and removed from the housing, the improvement comprising:
   a film footage reference means supported on the housing;
   a powered gear train for advancing the film;
   a threaded member operable by said gear train at a predetermined rate;
   a bracket means operable from an ineffective position to an effective position and in said effective position in engagement with said threaded member, said bracket means being moved from said ineffective position to said effective position by inserting the film supply cartridge into the housing, and said bracket means being moved from an initial position to an advanced position by said threaded member; and
   a spring member connected to said bracket means and having an integral pointer portion flexibly movable relative to said film footage reference means by movement of said bracket means for indicating the amount of film advanced.

* * * * *